June 23, 1959 — T. HINDMARCH — 2,891,645
SAFETY COUPLING FOR POWER TRANSMISSION MECHANISMS
Filed Nov. 2, 1953 — 4 Sheets-Sheet 1

Inventor
T. Hindmarch

June 23, 1959     T. HINDMARCH     2,891,645
SAFETY COUPLING FOR POWER TRANSMISSION MECHANISMS
Filed Nov. 2, 1953     4 Sheets-Sheet 2

Inventor
T. Hindmarch

June 23, 1959  T. HINDMARCH  2,891,645
SAFETY COUPLING FOR POWER TRANSMISSION MECHANISMS
Filed Nov. 2, 1953  4 Sheets-Sheet 3

Inventor
T. Hindmarch

United States Patent Office 2,891,645
Patented June 23, 1959

2,891,645

SAFETY COUPLING FOR POWER TRANSMISSION MECHANISMS

Thomas Hindmarch, Chesham, England

Application November 2, 1953, Serial No. 389,826

Claims priority, application Great Britain November 3, 1952

3 Claims. (Cl. 192—87)

This invention relates to power transmission mechanisms of the kind used in ships in which there is incorporated a fluid pressure operated friction clutch or coupling capable of limited slip while transmitting torque.

In some other forms of slipping clutches provision has been made for the locking together of the driving and driven members by bolts or other rigid means in the event of the clutch or coupling becoming unserviceable, in order that the vessel would not be deprived of means of propulsion.

The object of the present invention is to provide an emergency coupling which can be brought into operation at any time without mechanical modification of the mechanism, and with advantages over the solid drive heretofore used in such circumstances.

The invention consists in a fluid pressure operated friction clutch and coupling comprising a shaft, at least one friction member mounted for rotation coaxially of and free of said shaft, at least one friction member mounted upon the shaft for rotation therewith and for movement longitudinally thereof by fluid pressure to engage the clutch, the clutch being adapted to transmit torque of predetermined limited value between the coacting friction members before slipping, a first coupling member mounted coaxially with said shaft for rotation with said first mentioned friction member, a second coupling member mounted on the shaft for rotation therewith and for movement longitudinally thereof to engage the coupling, the coupling members each having projection members thereon adapted to be engaged by the projection members on the other coupling member when the coupling is engaged, the circumferential widths of the projection members being less than the circumferential widths of the spaces between the projection members on the cooperating coupling member to allow restricted relative rotational movement between the coupling members in both directions of relative rotational movement.

When a clutch or coupling of the kind adapted to transmit torque when slipping is used between, for example, a multicylinder diesel engine and a ship's propeller, the clutch may slip slightly in either a forward or reverse direction of rotation depending on the value and frequency of the components of the oscillatory torque. As the value of these components varies considerably with slight changes of engine speed and drive conditions, there is usually a slight progression of slip in either a forward or reverse direction of rotation. It is therefore desirable that the clutch or coupling having positively engageable projection members should not prevent or hinder this slip, at least during normal running, in order that advantage may be taken of this feature to eliminate or reduce the value of these oscillatory torques.

The accompanying drawings show, by way of example only, a number of embodiments of the invention and in which.

Figure 8:
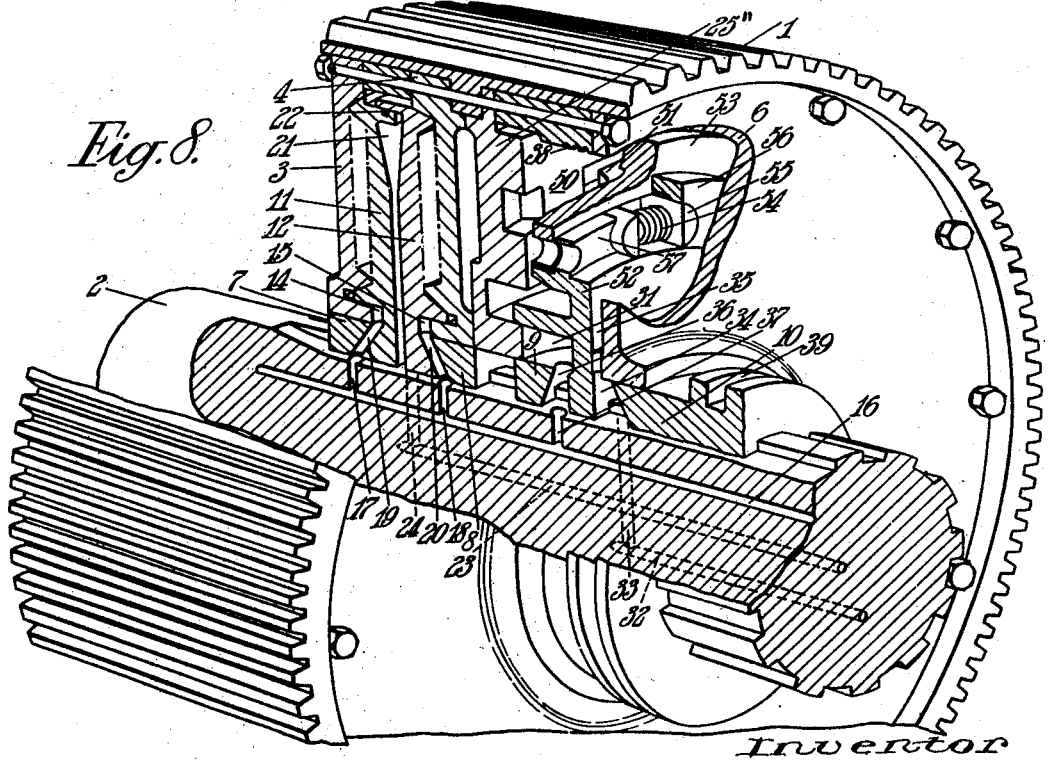
Figure 8 shows a perspective cut-away view of a further embodiment of the invention.
Figure 9:
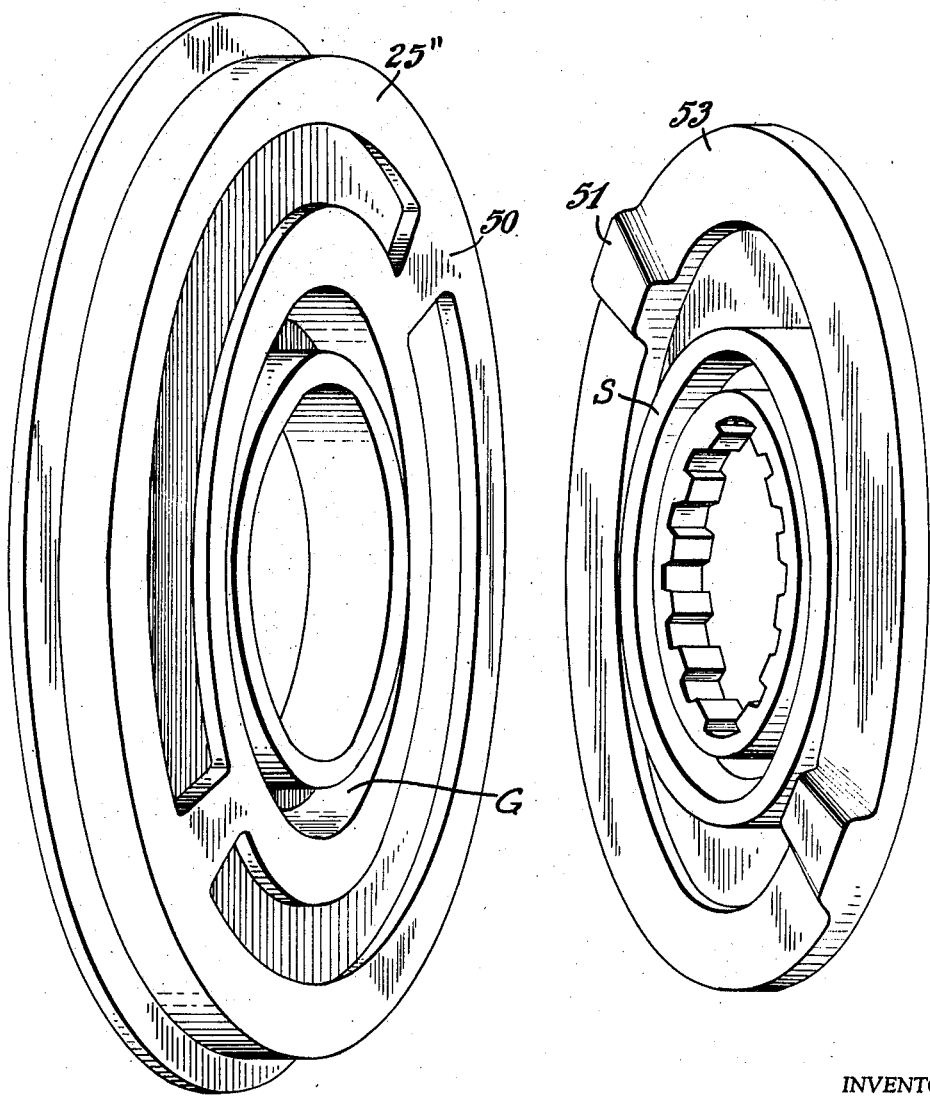
Figure 9 is an exploded perspective view of the coupling members of Figure 8 having projections thereon.

Figure 8 clearly shows the relative disposition of the various parts of the coupling and in which a number of the parts are the same as those indicated by the same reference numbers in the other figures. It therefore materially assists in the understanding of the invention to make reference to this figure in conjunction with the other figures where appropriate. The features by which the construction of Figure 8 differs from those of the others is dealt with in the specific description relating to this figure.

Figure 1:
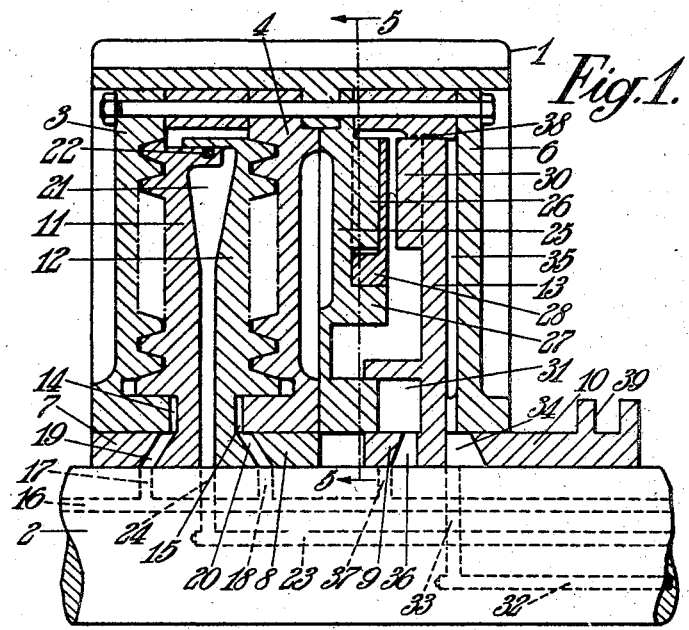
Figure 1 is a section taken through the axis of one form of combined friction and positive clutch or coupling constructed in accordance with the invention.

Figure 1 shows one embodiment of the invention in which the clutch and safety coupling are both incorporated in a gear wheel which is driven by means of a suitable pinion engaging teeth on the periphery of the outer member 1 and which, when the clutch is engaged, drives shaft 2. The outer gear ring 1 is suitably fixed by bolts to members 3, 4, 25 and 6, which, when the clutch is disengaged, rotate freely on bosses 7, 8, 9 and 10 formed on members 11, 12 and 13. Members 11, 12 and 13 are keyed or splined to the shaft 2 in such a manner as to be rotatably fixed but axially free with reference to the shaft. The clutch is held in the disengaged position by fluid pressure applied to chambers 14 and 15 via fluid ways 16, 17 and 18 in shaft 2, and fluid ways 19 and 20 in members 11 and 12. The clutch is engaged by applying pressure fluid to chamber 21, bounded by members 11 and 12 and seal means 22, via fluid ways 23 and 24 in shaft 2, thereby forcing the members 11 and 12 apart in an axial direction so that the V-shaped rings formed at their outer surfaces engage with corresponding grooves formed on the inner surfaces of members 3 and 4.

The relationship between the projected area in the V-shaped engaging surfaces, the angle of the V-shaped surfaces, the difference in area of chambers 21, 14 and 15, the applied fluid pressure and the oil film which is maintained on the friction surfaces, together permit the above oscillatory slip to occur without damage to the engaging parts.

Figure 5:
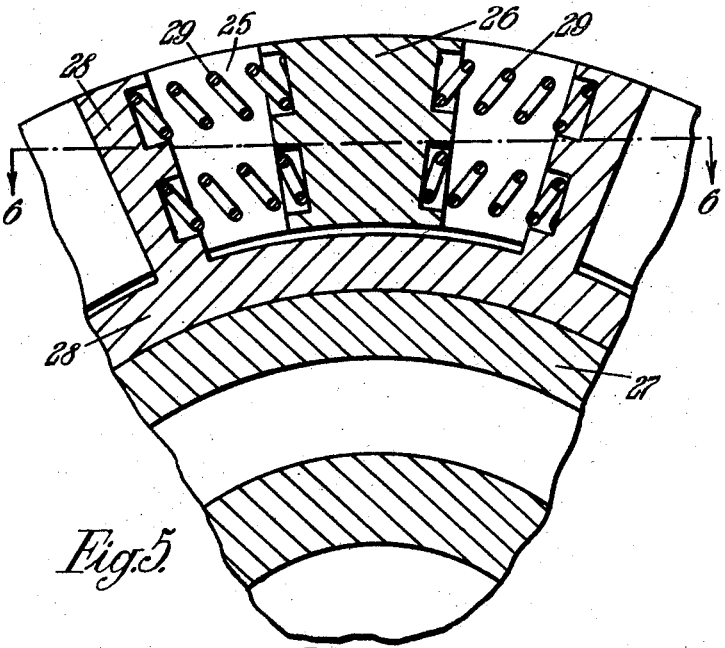
Figure 5 is a part elevation part section taken on the line 5—5 of Figure 1.

Adjacent to member 4, and rigidly attached to the gear ring 1, is member 25 which has formed thereon member 26, a safety lock or positive clutch, the arcuate length of which is made small in relation to the whole circle. Surrounding lock member 26 and supported freely on spigot 27 is partially hollowed out section shaped member 28 which can rotate over a small arc in relation to the lock 26 but is constrained by spring means 29 (Figure 5). The arcuate length between the outer faces 28a of member 28 is as small as possible in order to leave the maximum free space or travel. On member 13 is formed a corresponding driven member 30 whose arcuate length is also made small.

When the safety coupling is not required member 13 is held out of engagement by fluid pressure to chamber 31 via ways 16 and 37 in shaft 2 and way 36 in member 13. The engagement of the safety coupling is effected by applying fluid pressure from the same or an independent source of pressure to chamber 35 bounded by members 6 and 13 and seal means 38 via fluid ways 32 and 33 in shaft 2 and fluid way 34 in member 13, the area of chamber 35 being greater than that of chamber 31.

Should driven projection member 30 not be adjacent member 28 when the fluid pressure is applied to chamber 35, member 13 will move into the engaged position but will have no effect until the progressive slip referred to above allows the outer faces of the two members 28 and 30 to come into contact. In the meantime the clutch will function as though the safety clutch were not engaged. When however the faces of the driving and driven members, 28 and 30, come into contact due to the progressive slip, the spring or resilient means 29 will be compressed until the applied torque (the steady applied torque together with the total effect of the oscillatory torque) is counter-balanced and the combination will then function as a torsional damper. If however, members 28 and 30 are opposite one another, no engagement will take place until the progressive slip permits of this engagement; after which the combination will function as described above. If, however, it is desired to ensure early engagement, the pressure applied to chamber 21 of the friction clutch may be reduced by manual or automatic means so that sufficient slip takes place to ensure engagement; after which the pressure in chamber 21 may be restored to its normal value.

An important advantage of the fluid pressure operated friction clutch is its torque limiting ability, i.e. that it will slip if the torque exceeds a predetermined figure. In a ship, in the absence of a torque limiting device, there is always present considerable risk of severe damage to, or failure of, the transmission should the propeller strike a submerged object. My safety coupling also has a torque limiting feature in this way. When the safety coupling is engaged, the friction clutch will slip until the faces of driving members 28 and 30 come into contact and the resilient means 29 will be compressed allowing the transmitted torque to be built up slowly, thereby reducing considerably the risk of damage or failure. In addition I apply a suitable taper on the engaging faces of driving members 28 and 30 and I design the area of chamber 35 and I adjust the fluid pressure to such a magnitude as to enable member 13 to be forced out of engagement should the torque rise beyond a predetermined overload. This taper also facilitates disengagement.

In the event of failure of the hydraulic clutch the alternative safety coupling can be brought into operation by the independent fluid pressure operating on member 13 and in the event of total failure of pressure from whatever cause the safety coupling may still be operated mechanically by the following means.

I provide on member 13 on the boss 10 a groove 39 which is engaged by a suitable fork member directly, or via suitable bearings or the like, so that the engagement of the safety coupling may be effected by manual or alternative mechanical means. In contrast to the fluid pressure operation of the safety coupling which may be used in rotation or at rest, I generally utilize the mechanical method only at rest and inch it into a suitable position, engaging members 28 and 30 by the mechanical means via groove 39 and then start the prime mover in the normal manner. But to effect engagement, by mechanical operation, in a ship which is under way, and the propeller is trailing, the prime mover must be brought to the corresponding speed and then engagement by mechanical means becomes possible.

To preserve balance and to remove or reduce the loads on the bearing surfaces I usually employ at least two sets of members 26, 28 and 30.

In some cases it is not required to allow any relative rotation between the two halves of the positive clutch when the safety coupling is engaged. In such cases a multiplicity of members 28 and 30 are employed and so formed that the arcuate space between the adjacent members 28 is completely filled by one of the members 30 when the safety coupling is fully engaged. The engaging faces of these members are then in general given a considerable taper to facilitate engagement and disengagement.

Lock member 26 and spigot 27 have been shown on a separate member 25 but they may of course, be formed when more convenient on the outer face of member 4.

Figure 2:
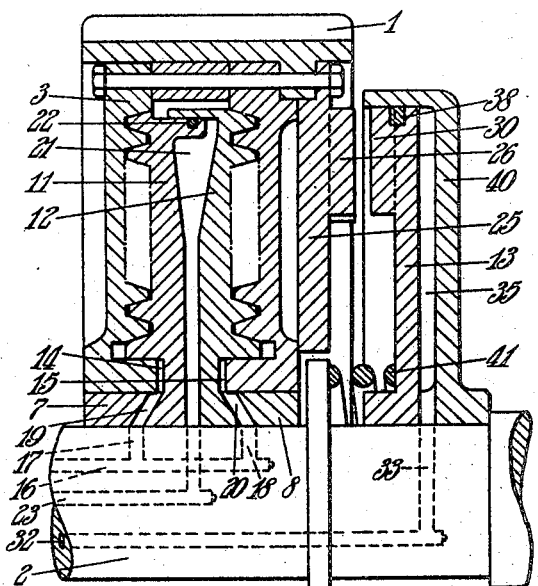
Figure 2 is a like section showing a modified form of construction in which the positive clutch or coupling is disengageable by spring means.

In the construction illustrated in Figure 2, which is useful when the mechanical engagement means 39 is not required, and wherein parts corresponding to those in Figure 1 bear the same reference characters, the chamber 35' is bounded by member 13', seal means 38', and member 40 which is rigidly fixed to the shaft. There is thus no relative rotation between members 13' and 40 and the seal means is consequently simplified.

It will be seen that the arcuate member 26' on the member 25' is not surrounded by a hollowed out section shaped member 28 and the chamber 31 between the members 13 and 25, which serves to hold the member 13 out of engagement when the safety coupling is not required, as in Figure 1, is omitted.

The disengaging of the safety coupling is effected by means of a single spring 41 (or alternatively a number of small compression springs) placed between the member 13' and a collar 42 formed on shaft 2.

Figure 3:
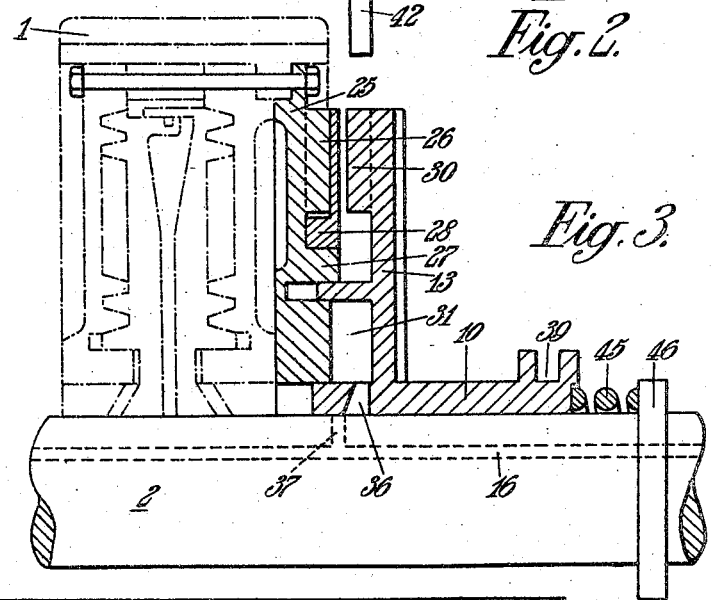
Figure 3 is a like section showing a further modified form of construction in which the positive clutch or coupling is engageable by spring means.
Figure 7:
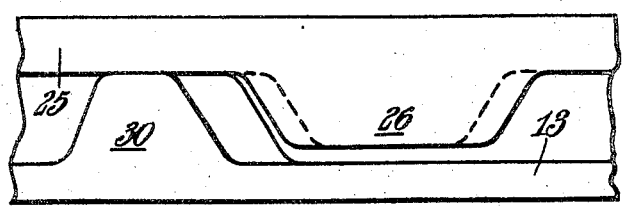
Figure 7 is a part elevation part section showing an alternative form of projection means.

Figure 3 shows a further embodiment in which parts similar to those in Figure 1 bear the same reference characters, and in which the safety coupling is engaged by spring means 45 positioned between the end of boss 10 and a collar 46 formed on the shaft 2. In service, when fluid pressure is available, the coupling is held in a disengaged position by fluid pressure supplied to the chamber 31 by way of the components 16 and 37 in the shaft 2 and the component 36 in the member 13. The safety coupling moves into engagement when this fluid pressure fails. In general it is preferable to provide alternative disengagement means via groove 39 so that the coupling may be held in the disengaged position when the machinery is stopped and no fluid pressure is available.

Figure 4:
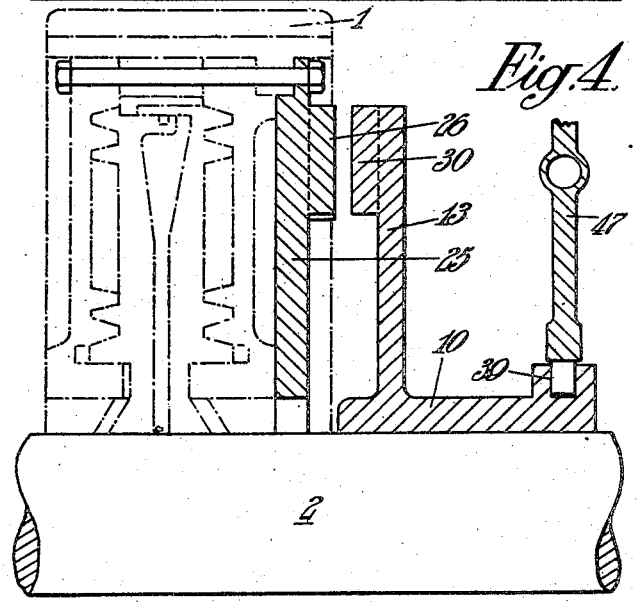
Figure 4 is a further like section showing a still further modified form of construction in which the positive clutch or coupling is engageable and disengageable by mechanical means.

Figure 4 illustrates a still further construction in which the operation of the safety coupling is by manual or power operated means via for instance member 47 cooperable with the groove 39 on the boss 10.

Figure 6:
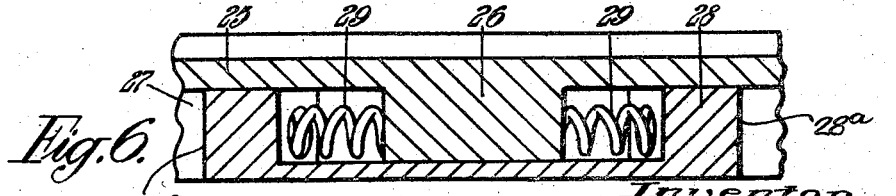
Figure 6 is a part elevation part section taken on the line 6—6 of Figure 5.

Figures 5 and 6 show sections through the resilient engaging member 25 of Figures 1 and 3 in which the projection 26 and the abutment 28 on each side have recesses in which are positioned the ends of the springs 29, restricted rotational movement of the abutment members being allowed about the bearing ring 27. The spaces on each side of the abutment members are for the entry of the driving members 30 when the safety lock is engaged.

Figure 8 shows a further form of construction incorporating a spring-coupling and I will now set forth in detail, with reference to Figure 8, the manner of working according to my invention as already described. Adjacent member 25" is provided a spring coupling unit comprising in the main, items 52, 53, 54, 55 and 56 (items 54, 55 being one of the resilient units). Central member 52 is keyed or splined to shaft 2 in such a manner as to be rotatably fixed but axially free with reference to the shaft. The two outer disc members 53 and 56, which are fixed together, are held radially in true relation with the central member 52 by flange 57 formed on the central member 52. The two members 53 and 56 form the input element of the coupling while the central member 52 forms the output element, or vice versa with spring 54 therebetween. Formed on outer member 53 is driving member 51, whose arcuate length is made as small as possible. When the safety coupling is not required it is held out of engagement through central member 52 by fluid pressure to chamber 31 defined by annular groove G in member 25″ and annular outwardly extending flange S on the member 52 via ways 16 and 37 in shaft 2, and way 36 in member 52. The engagement of the safety coupling is effected by applying fluid pressure from the same or an independent source of pressure to chamber 35 contained by members 6 and 52 and seal means 38 via ways 32 and 33 in shaft 2, and fluid way 34 in member 52; the area of chamber 35 being greater than that of chamber 31. Should driving member 51 not be adjacent to member 50 when the fluid pressure is applied to chamber 35, the spring coupling unit moves into the engaged position but has no effect until progressive slip in the clutch 25″ referred to allows the driving members 50 and 51 to come into contact. In the meantime the clutch functions as though the safety clutch were not engaged. When, however, the faces of the driving members 50 and 51 come into contact due to progressive slip, the spring or resilient means is compressed until the applied torque is counter-balanced and the combination will then function in the manner already described. If, however, driving members 50 and 51 are opposite one another, no engagement takes place until the progressive slip permits of this engagement. If, however, it is desired to ensure early engagement, the pressure applied to chamber 21 of the friction clutch may be reduced.

This type of clutch has torque limiting ability. The friction clutch will slip until the faces of driving members 50 and 51 come into contact, and the resilient units will be compressed, allowing the transmitted torque to build up slowly. The use of a suitable taper on the engaging faces of driving members 50 and 51, together with a suitable choice of the area of chamber 35 and the applied fluid pressure, will enable the spring coupling unit (via central member 52) to be forced out of engagement should the torque become excessive.

As before, in the event of failure of the hydraulic clutch the alternative safety coupling can be brought into operation by the independent fluid pressure operating on member 52, and, in the event of total failure of pressure from whatever cause, the safety coupling may still be operated mechanically since I provide on member 52 a groove, 39, which is engaged by a suitable fork member operated by manual or alternative mechanical means.

Again I preserve balance and remove or reduce loads on bearing surfaces by employing at least two sets of driving members 50 and 51.

Again in cases in which movement between two halves of the clutch is not required I employ a multiplicity of driving members 50 and 51 so that the arcuate space between the adjacent members 50 is completely filled by one of the members 51 when the safety coupling is fully engaged. The engaging faces are again given a considerable taper.

The control valve for the operation of the safety coupling may be coupled directly to the valve operating the friction clutch. It is then preferable to arrange the control lever or other control means so that it has the following positions:

(a) Friction clutch and safety coupling both disengaged,
(b) Friction clutch only engaged,
(c) Friction clutch and safety coupling engaged.

The movement of the lever from position (b) to position (c) is through a gate or other like arrangement so that position (c) cannot be reached by accident when first engaging the transmission. Where separate controls are used they are interlocked.

It may be seen from the foregoing description that the advantages of my invention are that a drive is assured under all circumstances and if desired the drive through the safety lock may be made resilient, which resilience may be in such a form as to reduce or eliminate torsional vibrations. Furthermore, provision may also be provided for releasing the drive under circumstances when excessive overload is given to the transmission.

I claim:

1. A fluid pressure operated friction clutch and coupling comprising a shaft, at least one friction member mounted for rotation coaxially of and free of said shaft, at least one friction member mounted upon the shaft for rotation therewith and for movement longitudinally thereof by fluid pressure to engage the clutch, the clutch being adapted to transmit torque of predetermined limited value between the coacting friction members before slipping, a first coupling member mounted coaxially with said shaft for rotation with said first mentioned friction member, a second coupling member mounted on the shaft for rotation therewith and for movement longitudinally thereof to engage the coupling, the coupling members each having projection members thereon adapted to be engaged by the projection members on the other coupling member when the coupling is engaged, the circumferential widths of the projection members being less than the circumferential widths of the spaces between the projection members on the co-operating coupling member to allow restricted relative rotational movement between the coupling members in both directions of relative rotational movement, and means associated with the projection members on at least one of the coupling members, with the projection members being mounted for restricted rotational movement about the axis of the shaft against the action of said last named means.

2. A fluid pressure operated friction clutch and coupling comprising a shaft, a first pair of disc-like friction members mounted spaced apart for rotation together coaxially of and free of said shaft, a cylindrical outer member joining the peripheries of said first friction members to form a hollow drum-like construction, a second pair of disc-like friction members mounted upon the shaft within said drum-like construction for rotation with the shaft and for movement longitudinally thereof away from one another by the pressure of fluid introduced therebetween to contact with their remote surfaces the inner surfaces of the first pair of friction members to engage the clutch, the clutch being adapted to transmit torque of a predetermined limited value between the coacting friction members before slipping, a first disc-like coupling member mounted coaxially with said shaft and attached at its periphery to said cylindrical outer member, a disc-like abutment member mounted coaxially with said shaft and attached at its periphery to said cylindrical outer member and spaced from the first coupling member to form a hollow drum-like construction therewith, a second disc-like coupling member mounted coaxially with said shaft and for movement longitudinally thereof within the hollow drum-like construction between the first coupling member and the abutment member and making a fluid sealing contact with the cylindrical outer member, and forming a fluid pressure chamber with the abutment member, so that by the introduction of pressure fluid therein the second coupling member is moved towards the first coupling member, projection members upon each coupling member adapted to be engaged by the projection members on the other coupling member when the coupling is engaged, the circumferential widths of the projection members being less than the circumferential widths of the spaces between the projection members on the other coupling member to allow restricted relative rotational movement between the coupling members in both directions of relative rotational movement, spring means associated with the projection members on at least one of the coupling members, said projection members being mounted for restricted rotational movement about the axis of the shaft against the action of the spring means.

3. A fluid pressure operated friction clutch and coupling comprising a shaft, a first pair of disc-like friction members mounted spaced apart for rotation together coaxially of and free of said shaft, a cylindrical outer member joining the peripheries of said first friction members to form a hollow drum-like construction, a second pair of disc-like friction members mounted upon the shaft within the drum-like construction for rotation with the shaft and for movement longitudinally thereof away from one another by the pressure of fluid introduced therebetween to contact with their remote surfaces the inner surfaces of the first pair of friction members to engage the clutch, the clutch being adapted to transmit torque of a predetermined value between the coacting friction members before slipping, a first disc-like coupling member mounted coaxially with said shaft and attached at its periphery to said cylindrical outer member, a disc-like abutment member also mounted coaxial with the said shaft and attached at its periphery to said cylindrical outer member and spaced from the first coupling member to form a hollow drum-like construction therewith, a second disc-like coupling member mounted coaxially with said shaft for movement longitudinally thereof within the hollow drum-like construction between the first coupling member and the abutment member and making a fluid sealing contact with the cylindrical outer member, and forming a fluid pressure chamber with the abutment member, so that by the introduction of pressure fluid therebetween the second coupling member is moved towards the first coupling member, tapered projection members upon said coupling members adapted to be engaged by the projection members on the other coupling member when the coupling is engaged, the circumferential widths of the projection members being less than the circumferential widths of the spaces between the projection members on the other coupling member to allow restricted free relative rotational movement between the coupling members in both directions of relative rotational movement, spring means associated with the projection members on the second coupling member, said projection members being mounted for restricted movement about the axis of the shaft against the action of the spring means, an annular groove in the side of the first coupling member adjacent the second coupling member and a cylindrical spigot on the side of the second coupling member adjacent the first coupling member and slidably engaging in the groove in the latter and forming a pressure fluid chamber, so that by the introduction of pressure fluid therein the second coupling member is moved away from the first coupling member to disengage the same.

References Cited in the file of this patent

UNITED STATES PATENTS

| | | |
|---|---|---|
| 503,923 | Wolf | Aug. 22, 1893 |
| 655,973 | Hakewessell et al. | Aug. 14, 1900 |
| 727,390 | Leikem | May 5, 1903 |
| 835,721 | Winton | Nov. 13, 1906 |
| 874,388 | Butler | Dec. 24, 1907 |
| 2,554,740 | Jellis | May 29, 1951 |
| 2,592,695 | Hindmarch | Apr. 15, 1952 |
| 2,622,714 | Cardwell et al. | Dec. 23, 1952 |
| 2,633,954 | Allen | Apr. 7, 1953 |
| 2,633,955 | Allen | Apr. 7, 1953 |